United States Patent
Dominguez et al.

(10) Patent No.: US 12,253,999 B2
(45) Date of Patent: Mar. 18, 2025

(54) DATABASE UPDATES

(71) Applicant: Huawei Technologies Co., Ltd., Shenzhen (CN)

(72) Inventors: David Dominguez, Munich (DE); Vinoth Veeraraghavan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 17/466,946

(22) Filed: Sep. 3, 2021

(65) Prior Publication Data
US 2021/0397605 A1 Dec. 23, 2021

Related U.S. Application Data

(63) Continuation of application No. PCT/EP2019/055274, filed on Mar. 4, 2019.

(51) Int. Cl.
*G06F 16/20* (2019.01)
*G06F 11/14* (2006.01)
(Continued)

(52) U.S. Cl.
CPC ...... *G06F 16/2379* (2019.01); *G06F 11/1451* (2013.01); *G06F 16/273* (2019.01); *G06F 2201/80* (2013.01); *G06F 2201/82* (2013.01)

(58) Field of Classification Search
None
See application file for complete search history.

(56) References Cited

U.S. PATENT DOCUMENTS 5,999,931 A * 12/1999 Breitbart ............. G06F 16/2329
6,219,675 B1 * 4/2001 Pal ...................... G06F 16/2343
707/999.008
(Continued)

FOREIGN PATENT DOCUMENTS

EP 1349085 A2 10/2003
EP 1498815 A2 1/2005

OTHER PUBLICATIONS

Abdallah et al., "One-Phase Commit: Does It Make Sense?," Proceedings 1998 International Conference on Parallel and Distributed Systems, Total 11 pages, Institute of Electrical and Electronics Engineers, New York, New York (Dec. 1998).
(Continued)

*Primary Examiner* — Belix M Ortiz Ditren
(74) *Attorney, Agent, or Firm* — Leydig, Voit & Mayer, Ltd.

(57) ABSTRACT

A database server for implementing a distributed database, the server having access to a data store holding a first copy of the database managed by the database server and having a processor and interfacing means for client communication and for communication with a second database server managing a second copy of the database, the database server may implement a change to the database communicated from the client by the steps of: communicating the change to the second database server; storing in the first copy of the database a tentative record of the change; and on receiving from the second database server a storing record acknowledgement about the change in the second copy of the database: instructing the second database server to store a permanent record of the change in the second copy of the database and storing in the first copy of the database a permanent record of the change.

16 Claims, 7 Drawing Sheets

(51) Int. Cl.
  *G06F 16/23* (2019.01)
  *G06F 16/27* (2019.01)

(56) References Cited

U.S. PATENT DOCUMENTS

| | | | | |
|---|---|---|---|---|
| 6,845,384 | B2 * | 1/2005 | Bamford | G06F 16/27 |
| 6,898,642 | B2 * | 5/2005 | Chafle | G06F 16/1834 |
| | | | | 709/251 |
| 8,838,534 | B2 * | 9/2014 | Fowler | G06F 16/27 |
| | | | | 707/684 |
| 11,222,008 | B2 * | 1/2022 | Palmer | G06F 16/2315 |
| 2002/0152271 | A1 * | 10/2002 | Chafle | H04L 12/1827 |
| | | | | 709/204 |
| 2005/0125458 | A1 * | 6/2005 | Sutherland | G06F 16/25 |
| 2006/0248232 | A1 * | 11/2006 | Chasman | G06F 16/273 |
| | | | | 709/248 |
| 2015/0278333 | A1 * | 10/2015 | Hirose | G06F 16/283 |
| | | | | 707/607 |

OTHER PUBLICATIONS

Agrawal et al., "A Taxonomy of Partitioned Replicated Cloud-based Database Systems," IEEE Data Engineering Bulletin vol. 38, No. 1, pp. 4-9, Institute of Electrical and Electronics Engineers, New York, New York (Mar. 2015).

Zhu "Non-Blocking One-Phase Commit Made Possible for Distributed Transactions over Replicated Data," 2015 IEEE International Conference on Big Data (Big Data), pp. 2874-2876, Institute of Electrical and Electronics Engineers, New York, New York (Oct. 29-Nov. 1, 2015).

Zhu et al., "To Vote Before Decide: A Logless One-Phase Commit Protocol for Highly-Available Datastores," Total 11 pages (Jan. 11, 2017), arXiv:1701.02408v2 [cs.DC].

Stamos et al., "Coordinator Log Transaction Execution Protocol," Distributed and Parallel Databases, vol. 1, No. 4, pp. 1-41 (Oct. 1993).

"GT.M Administration and Operations Guide, " UNIX Edition, V6.1-000, Total 471 pages, Fidelity Information Services, Inc. (Sep. 4, 2014).

* cited by examiner

DATABASE UPDATES

CROSS-REFERENCE TO RELATED APPLICATIONS

This application is a continuation of International Application No. PCT/EP2019/055274, filed on Mar. 4, 2019, the disclosure of which is hereby incorporated by reference in its entirety.

FIELD

This disclosure relates to making updates to the information stored in a database.

BACKGROUND

Figure 1:
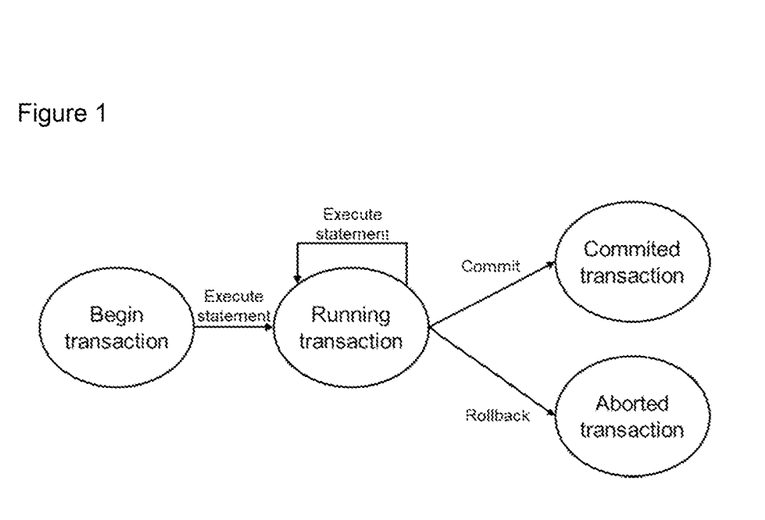
FIG. 1 shows a state diagram for making a change to a database.

A standard database transaction is a sequence of database statements (operations), which indicate the changes to the database state, and a commit that applies all the changes in the transaction permanently to the database. A state diagram for this is shown in FIG. 1.

Figure 2:
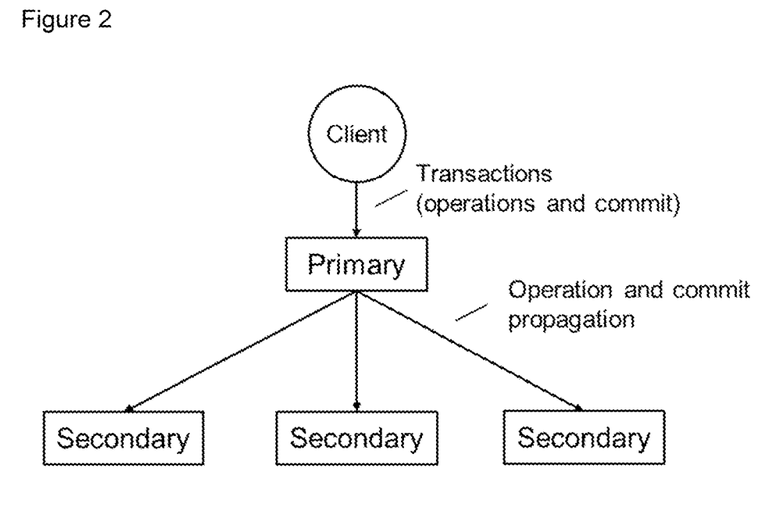
FIG. 2 shows the generalized structure of a distributed database.

It is common for databases to be distributed over multiple servers. Each server maintains its own copy of the database. This has the advantages that a client may access any of the servers to query the database, and that if one of the servers fails the database can remain available and in due course the failed server can be recovered. A client communicates with the servers to servers to make queries on the database. The architecture of such a system is illustrated in FIG. 2.

To ensure it is clear which copy of the database is authoritative, it is conventional for one of the servers to be a primary server and for the, or each, other server to be a secondary server. The copy of the database held by the primary server is treated as definitive. The protocol that the servers use to make updates to the database may be such that the primary server has a special role in making updates to the database.

Figure 3:
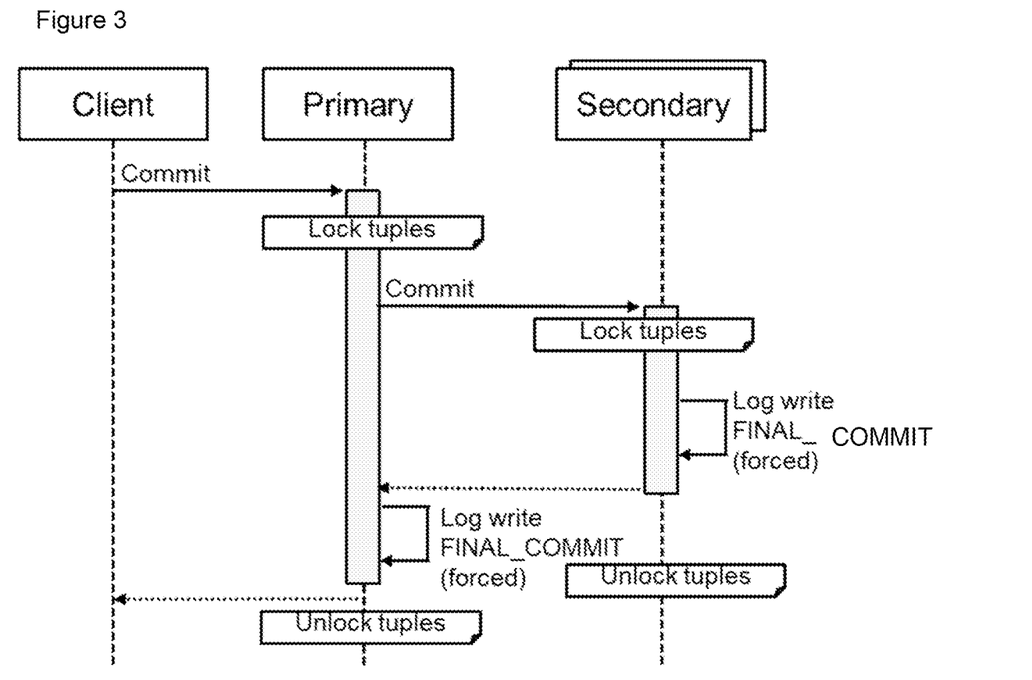
FIG. 3 shows a message flow for making a change in a distributed database.

FIG. 3 shows one process for making updates to a distributed database. In this example there is a primary server, a secondary server, and a client which has write access to the database. The client transmits a message to the primary server requesting that a change be made to the database. The primary server sends a message to the secondary server requesting that the changed be made. The secondary server makes the change in its copy of the database and sends an acknowledgement to the primary server. When the primary server has received the acknowledgement from the secondary server that the change has been made in the secondary server's copy of the database, the primary server knows that it is safe to make the change in its own copy of the database without risking corrupting the integrity of the system. It makes the change in its own copy of the database, and then sends an acknowledgement to the client that the change has been made. A problem with this approach, discerned by the inventors, is that making the definitive "final" change to the database typically requires a write to long-term storage, which can involve a relatively long delay. For example a typical latency for a write to disk storage may be as much as 30 ms. In comparison, network latencies may be in the range of 1 ms or below.

Figure 4:
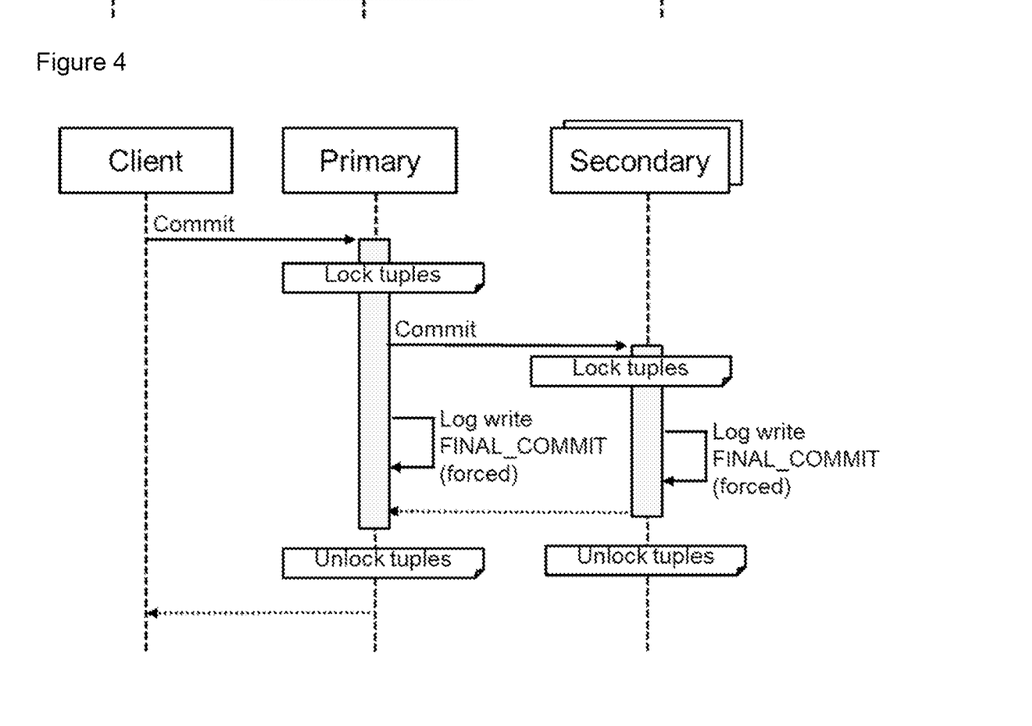
FIG. 4 shows a second message flow for making a change in a distributed database.

FIG. 4 shows one possible approach to addressing this. In the approach of FIG. 2 the primary server definitively (finally) commits the change to its copy of the database before it has received an acknowledgement from the secondary server that the secondary server has made the change. A problem with this approach is that if the primary server fails after committing the change (e.g. by writing to its log) but the message is still queued in a network and has not reached the secondary, then the state of the secondary will be inconsistent with that of the primary, and the change might be lost if the system is subsequently recovered from the secondary that had not committed the change.

The inventors have recognized that there is a need for a more robust way of making changes in a database with the possibility of reduced latency.

SUMMARY

A first aspect of the present disclosures provides a database server for implementing a distributed database, the server having access to a data store holding a first copy of the database that is managed by the database server and having a processor and one or more communication interfaces for communicating with a client and with a second database server managing a second copy of the database. The database server is configured to implement a change to the database communicated from the client by the steps of: communicating the change to the second database server; storing in the first copy of the database a tentative record of the change; and on receiving from the second database server an acknowledgement that it has stored a record of the change in the second copy of the database: (i) instructing the second database server to store a permanent record of the change in the second copy of the database and (ii) storing in the first copy of the database a permanent record of the change.

Each of the secondary servers is capable of being promoted to act as the primary server, for example if the previous primary server becomes corrupted or unavailable. If a server becomes corrupted or unavailable (whether it was previously acting as a primary or a secondary server) it can recover its local copy of the database by communicating with whichever server is the primary server. This provides for a robust way for making changes in a database with reduced latency.

In an implementation form of the first aspect, the database server is configured to implement the change by: receiving an indication of the change from the client, the change involving the modification of one or more elements of the database; subsequent to the said receiving step but prior to the step of communicating the change to the second database server, locking in the first copy of the database the elements involved in the change; and subsequent to the step of receiving from the second database server an acknowledgement that it has stored a record of the change in the second copy of the database, unlocking in the first copy of the database the elements involved in the change.

In an implementation form of the first aspect, the database server is further configured to implement the change by: receiving an indication of the change from the client, the change involving the modification of one or more elements of the database; creating a backup of the element(s) involved in the change as existing prior to the change; and subsequent to the step of receiving from the second database server an acknowledgement that it has stored a record of the change in the second copy of the database, removing the backup.

In an implementation form of the first aspect, the database server is further configured to communicate the change to the second database server by sending a message to the second database server, the only change to the second database indicated by the message being the change communicated from the client.

In an implementation form of the first aspect, the database server is further configured to, having received acknowledgements from the second database server that it has stored records of multiple changes in the second copy of the database, instruct the second database server to store a permanent record of those multiple changes by transmitting to the second database server a single message or a group of associated messages.

In an implementation form of the first aspect, the database server is further configured to, in response to receiving from the second database server an acknowledgement that it has stored a record of the change in the second copy of the database, transmit to the client an acknowledgement of the change.

In an implementation form of the first aspect, the database server is further configured to, when it has been acting as a primary server and is subsequently demoted to acting as a secondary server, roll back in the first copy of the database changes that are designated only by temporary records but not roll back changes that are designated by permanent records.

In an implementation form of the first aspect, the database server is further configured to, when it has been acting as a primary server and fails without a secondary server being available and is subsequently restored as a primary server, transform the tentative records to permanent records.

In an implementation form of the first aspect, the database server has a recovery mode of operation in which, when the integrity of the first copy of the database is prejudiced, it automatically stores in the first copy of the database or a replacement version thereof permanent records for all changes for which only temporary records are stored in the first copy of the database.

In an implementation form of the first aspect, the database server is a primary database server and the second database server is a secondary database server.

In an implementation form of the first aspect, the database server is capable of operating as a secondary database server, and is configured to, when operating as a secondary database server implement a change to the database communicated from a primary database server by the steps of: receiving the change from the primary database server; storing in the first copy of the database a tentative record of the change; and transmitting to the primary database server an acknowledgement for the change.

In an implementation form of the first aspect, the database server is further configured to, when acting as a secondary database server: on receiving from the primary database server an instruction to store a permanent record of one or more changes in the second copy of the database, store in the first copy of the database permanent records of that or those changes.

In an implementation form of the first aspect, the server is further configured to, when acting as a secondary database server: subsequent to receiving a change from the primary database server and prior to storing a tentative record of the change, lock elements of the database to which the change relates; and subsequent to storing a tentative record of the change, unlock those elements.

In an implementation form of the first aspect, the server is further configured to, communicate the change to the second database server before storing in the first copy of the database a tentative record of the change.

A second aspect of the present disclosure provides a method for implementing a change to a database by means of a database server having access to a data store holding a first copy of the database, the method comprising: receiving from a client an indication of a change to the database; communicating the change to a second database server; storing in the first copy of the database a tentative record of the change; receiving from the second database server an acknowledgement that it has stored a record of the change in the second copy of the database; and subsequent to that receiving step: (i) instructing the second database server to store a permanent record of the change in the second copy of the database and (ii) storing in the first copy of the database a permanent record of the change.

In an implementation form of the second aspect, the method further comprises subsequent to the receiving step and before instructing the second database server to store a permanent record of the change in the second copy of the database, transmitting to the client an acknowledgment for the change.

BRIEF DESCRIPTION OF THE DRAWINGS

Aspects of present disclosure will now be described by way of example with reference to the accompanying drawings. In the drawings.

DETAILED DESCRIPTION

FIG. 2 shows the architecture of a distributed database system. The system comprises multiple servers, marked "primary" and "secondary". The servers can communicate with each other via a network. The network could be a private network or a publicly accessible network such as the internet, or may include portions of both types. Clients can access the servers to query the database and retrieve data from it. At least some of the clients can also request the servers to make changes in the database. Each server has its own copy of the database. A client can contact any of the servers to query the database. A client may in the first instance be able to contact any of the servers to request a change in the database, but it is preferred that any such request is forwarded to the primary server for processing. This allows the protocol to operate in the manner described below to avoid the database potentially becoming corrupted. To provide resilience, each of the secondary servers is capable of being promoted to act as the primary server, for example if the previous primary server becomes corrupted or unavailable. If a server becomes corrupted or unavailable (whether it was previously acting as a primary or a secondary server) it can recover its local copy of the database by communicating with whichever server is the primary server. The mechanisms for these processes will be described below.

Figure 5:
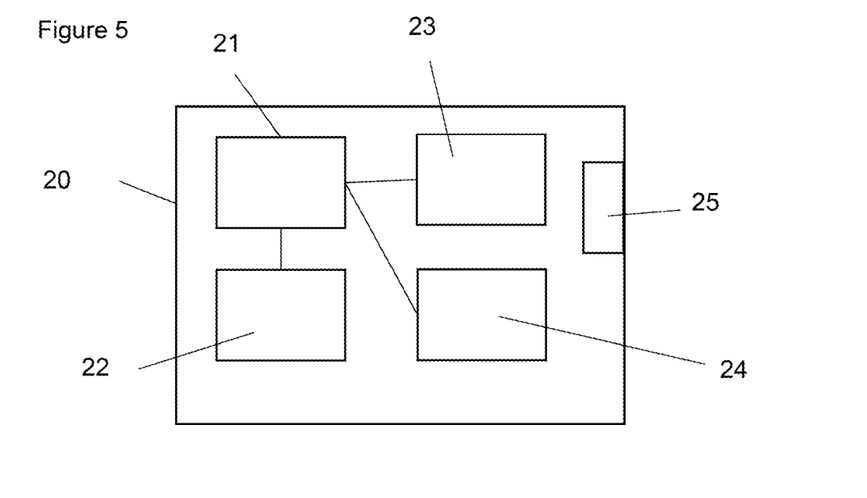
FIG. 5 illustrates the architecture of a database server.

FIG. 5 shows the architecture of a server 20. Each server comprises at least one processor 21 and a local memory 22. The local memory 22 stores in a non-transient form program code for causing the processor to execute the functions described herein. Each server has access to a respective data store 23, 24. The data store may be local to the server or remote from it. The server stores and maintains its own copy of the database in its data store. The data store may comprise one or both of a relatively low latency memory 23 such as a random access memory (RAM) implemented on an integrated circuit and a relatively high latency memory 24 such as a hard disk system using rotating magnetic platters. The server has a communication interface 25 for communicating with clients and other severs.

Exemplary mechanisms by which the servers can perform operations will now be described.

When a change is to be made to the database, the format of the data that is to be changed will depend on the format of the database. In one example, the database could store multiple blocks of data known as rows and each row could comprise data fields corresponding to multiple columns, each column corresponding to a category of data. For instance, if the database relates to train movements, there could be columns for arrival time and departure time, and multiple rows: one for each of a number of train services. In another example, the data could be stored in conceptually discrete blocks or blobs. The change to the database may be to change existing data (e.g. an update operation) or to add new data (e.g. an insert operation). The change may be communicated to the database system by passing it the new data that is to be stored (e.g. in the form of a data tuple) and/or by passing it logic that can be applied to the currently stored data to cause the change. Examples of the latter case are where logic is passed to the database to indicate which records are to be changed (e.g. all rows with an arrival time after 12:34) or to indicate what change is to be made (e.g. increase arrival time by 10 minutes). The database could implement SQL (structured query language) or any other suitable database protocol.

Figure 6:
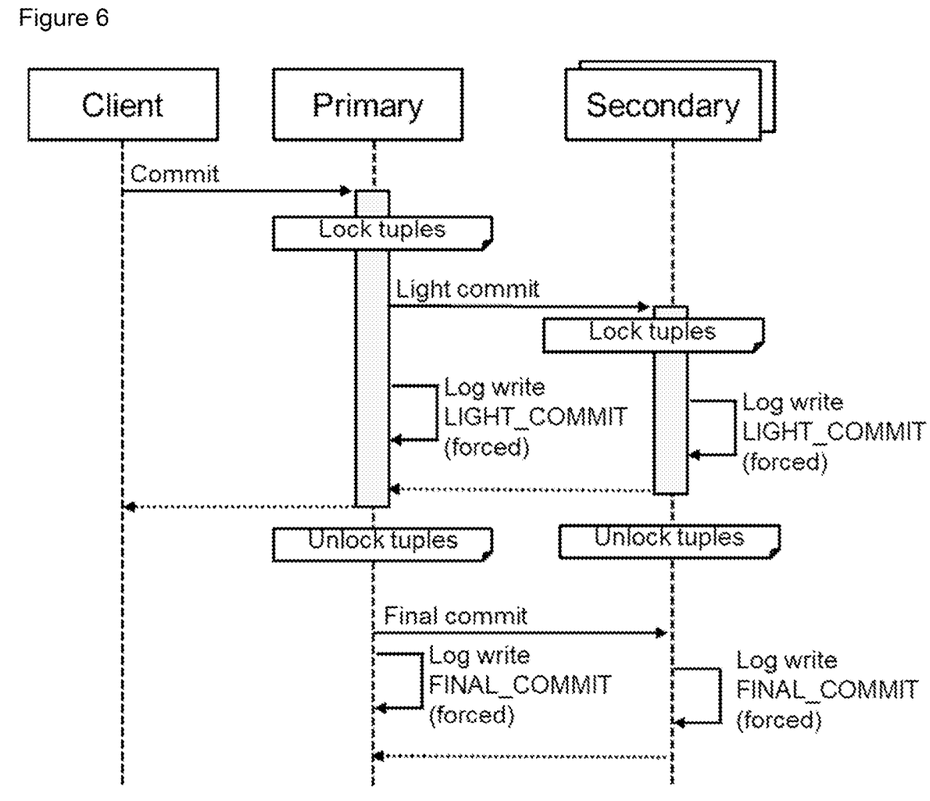
FIG. 6 illustrates a third message flow for making a change in a distributed database.

FIG. 6 shows the mechanism and signal flow for making a change to the database.

In FIG. 6, there is a client, a primary server and a secondary server. In practice there could be multiple clients, although only one would be expected to initiate any particular database change, and there could be multiple secondary servers. The primary and secondary servers could in practice have similar hardware and software but could simply be configured to function as primary and secondary servers respectively.

The change process proceeds as follows:
1. A message requesting a database change or commit is transmitted from the client to the primary server. The commit message indicates the change to be made to the database.
2. The primary server locks in its copy of the database the records (tuples) to be affected by the change. The locking of the tuples prevents them from being affected by other changes that might happen in parallel with the present one.
3. The primary server transmits a tentative or light commit message to the, or each, secondary server. The light commit message indicates the change to be made to the database. That is the same as the change indicated by the commit message from the client.
4. The primary server makes the change to its local copy of the database. It stores an indication that the change is at this stage tentative. That indication may be made by means of a flag associated with the changed data or by a record in a log maintained by the primary server.
5. In response to receiving the light commit message from the primary server, the or each secondary server locks in its copy of the database the records (tuples) to be affected by the change. It then makes the change to its local copy of the database. It stores an indication that the change is at this stage tentative. That indication may be made by means of a flag associated with the changed data or by a record in a log maintained by the primary server. Once those operations are complete it returns an acknowledgement message to the primary server.
6. In response to receiving the acknowledgement message(s) from the or each secondary server, the primary server transmits an acknowledgment message for the change to the client. On receiving that acknowledgement the client can consider the change to be complete, despite the fact that the change is considered by the database to be tentative at this stage.
7. When the primary server has sent the acknowledgement message to the client it unlocks in its local copy of the database that tuples that had been locked to make the change.
8. When a secondary server has sent its acknowledgement message to the primary server it unlocks in its local copy of the database that tuples that had been locked to make the change.
9. The primary server transmits to the or each secondary server a final commit message in respect of the change. The final commit message indicates which change it relates to.
10. The primary server updates its copy of the database to mark the change as finalized. After this the change is no longer considered to be tentative in that copy of the database.
11. In response to the final commit message the or each secondary server updates its copy of the database to mark the change as finalized. After this the change is no longer considered to be tentative in that copy of the database. Once this is done the secondary server transmits an acknowledgement message to the primary server.

At points in the process when the primary and secondary servers are performing operations in parallel, as indicated in FIG. 6, the order of steps as between the primary and secondary servers is unimportant.

The approach of the exemplary embodiment described with reference to FIG. 6 has the capacity to implement a change more quickly than the approach shown in FIG. 3. One metric for the time to implement a change is the delay between the change request from the client arriving at the primary server and the primary server transmitting to the client a reliable acknowledgement for the change. In the approach depicted in FIG. 6, the light commit can be made in a memory having lower latency than the memory in which the final commit is made. This can reduce the latency of the change operation from the client's perspective. As an example, each light commit can be made in a log file or other data structure that is held in a memory having lower latency for changes made by the processor of the respective server than the memory in which the final commit is made. The memory in which the light commit is made may be a random access memory (RAM). It may be implemented on an integrated circuit. The memory in which the final commit is made may be a disk storage system, e.g. one having rotating magnetic platters on which data is stored. Either of the systems may be implemented by one or more solid state disk drives, or non-volatile memory. If the light commit is implemented in a log file or other temporary storage, until the final commit is made the state of the database as indicated by that temporary storage will be different from that indicated in the storage where final commits are made. To accommodate this, in a preferred embodiment, when a client queries the database to request data from it, the server gives priority to the state of the database as indicated in the temporary storage, over the state indicated in the storage where final commits are made.

The approach of the exemplary embodiment described with reference to FIG. 6 separates the commit process in two states: a light commit and a final commit. The light commit durably applies the database change/transaction, but the change can still be undone with a rollback operation by a server, e.g. in the case of recovering the server from failure. This will be described further below. Once a change has been applied to the light commit stage, a user cannot roll back the change, and a query on the database will show the change as visible, as if it had been made by a standard commit. The final commit makes the transaction permanent. Then it cannot be undone even in the case of failure. The sequence of light commit followed by final commit sets the database state to the same state as if a standard commit had been implemented.

In the approach of FIG. 6, the protocol used by the client can be the same as for a conventional change operation. The light and final commit states are not visible to the client.

Figure 7:
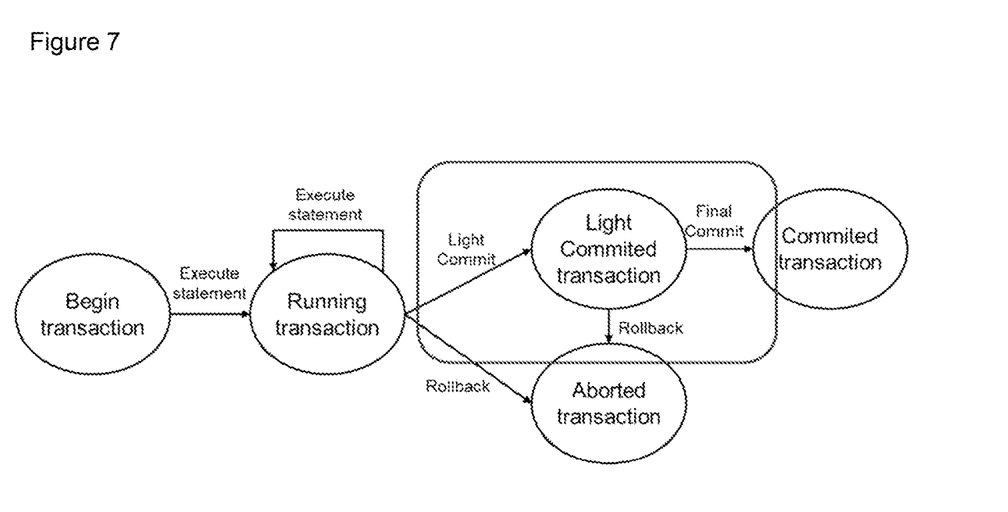
FIG. 7 shows a state diagram for a system implementing the flow of FIG. 6.

An exemplary embodiment of a state diagram for a transaction with the system of FIG. 6 is shown in FIG. 7.

Figure 8:
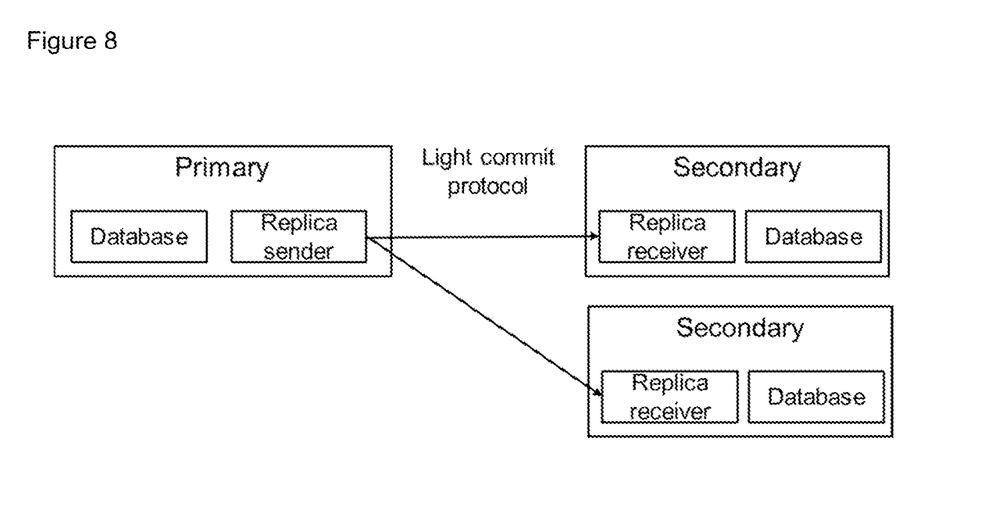
FIG. 8 shows the generalized functions for a system implementing the flow of FIG. 6.

FIG. 8 shows an exemplary embodiment of the logical functions of the primary and secondary servers in the approach of FIG. 6.

Figure 9:
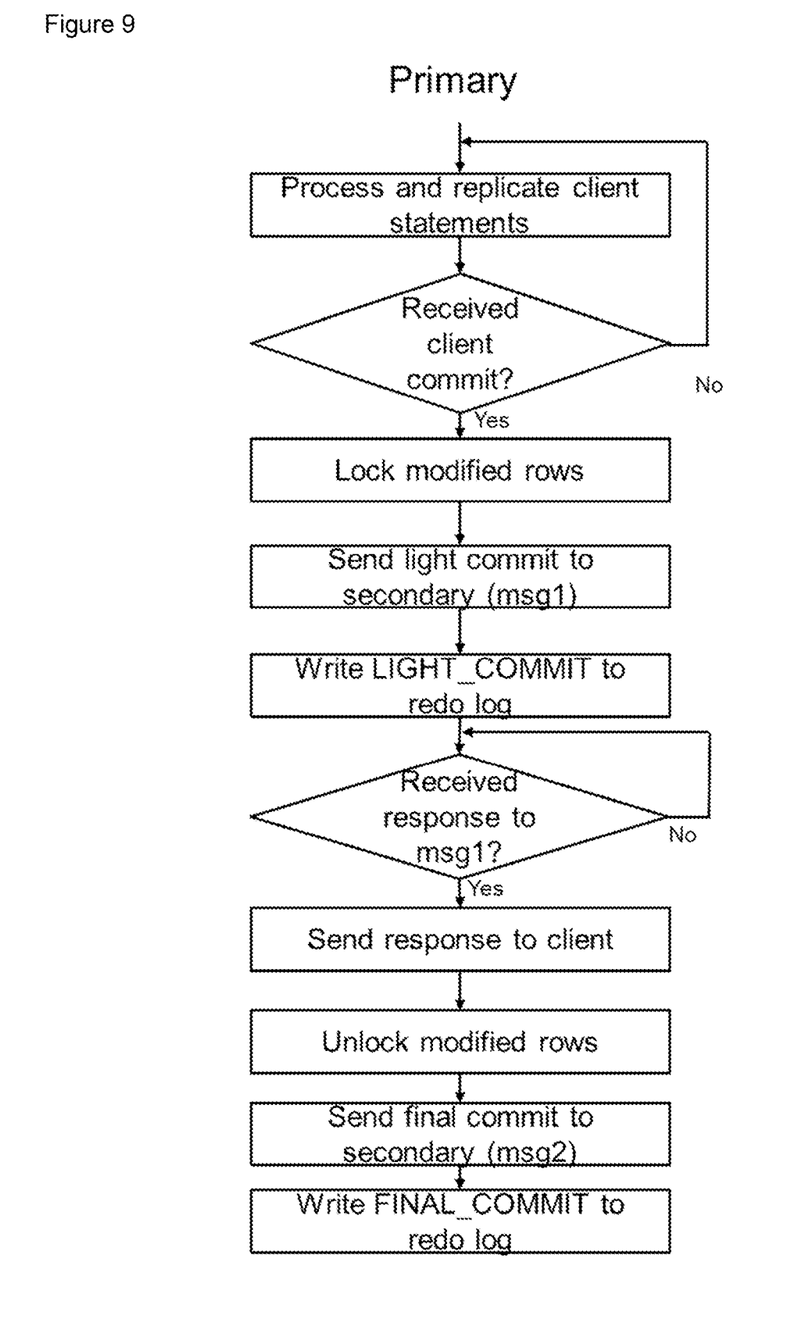
FIG. 9 is a flow diagram for a primary server implementing the flow of FIG. 6.
Figure 10:
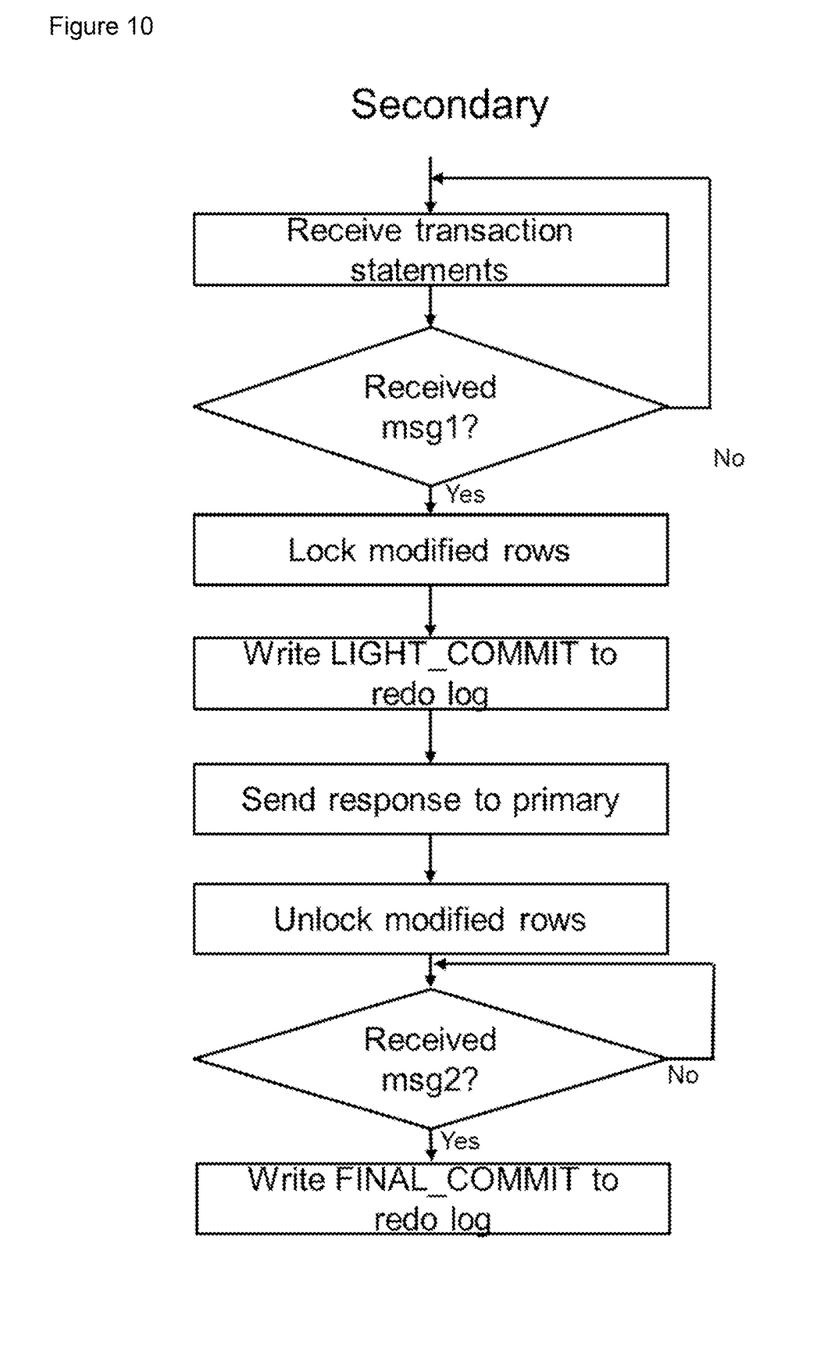
FIG. 10 is a flow diagram for a secondary server implementing the flow of FIG. 6.

FIGS. 9 and 10 show exemplary embodiments of flow diagrams for the operations performed by the primary and secondary servers to implement the approach of FIG. 6.

The present system can cope with failures in a number of ways.

If a secondary server fails it can be rebuilt from the state of the primary server as indicated by light and final commits.

If a primary server fails, a secondary server can take over as a primary server. All tentative (light) commits in that new primary server are marked as final, and its copy of the database is then treated as the reference copy of the database. The former primary server can then be rebuilt from the new primary server and act as a secondary server. In this situation, there may be multiple candidate secondary servers to take over from the original primary server. The state of their databases may be compared to identify the one that has implemented the most up-to-date changes from the primary server, and that one may be selected as the new primary server. For ease of computation, the secondary server with the most light commits waiting to be finalized may be selected as the new primary server.

The serialization order held in the primary server's copy of the database may conveniently be a sorted list of database operations, which is created from the execution of concurrent transactions on a given primary database state. If the list is replayed serially (i.e. with no concurrency) on another database which was formerly in the same state as the primary prior to the operations being implemented, then the resulting state of the second database will be equivalent to the state of the primary server's copy of the database.

The primary server may transmit final commit messages individually for each change to the database. Alternatively, it may be advantageous to batch changes together and send one final commit message to secondary servers for multiple changes. This can have the advantage of reducing the volume of messaging between the primary and secondary servers.

Some exemplary aspects of the correctness of node failure will now be discussed.

1. If a client has an opened transaction session and the primary node fails before the client has sent its commit message, the transaction is uncommitted and is simply rolled back as is known in the prior art (e.g. using a time out).
2. If a client sends a commit message to the primary server but the primary server did not replicate the light commit message, the transaction is simply rolled back.
3. If a primary server has sent the light commit message but has not received an acknowledgement of it then the following cases are possible:
   3.1. If the primary server failed after logging the light commit locally but no secondary received the light commit, the transaction is not committed and the primary server will undo the light committed transaction as part of the recovery and resynchronization process.
   3.2. If the primary server failed after one or more secondary servers received the light commit: the most advanced secondary server is promoted to the new primary server and finalizes the commit. During resynchronization, the failed primary server will receive the commit of the transaction.
   3.3. If the primary server failed after logging the light commit and one or more secondary servers received the light commit: the most advanced secondary server becomes the new primary server and finalizes the commit. During resynchronization, the failed primary server undoes the light committed transaction, and will receive (again) the commit of the transaction.
4. If the primary server acknowledged the commit, all secondary's have the light commit and the transaction will be committed. The failed primary server undoes the light committed transaction, and will receive (again) the commit of the transaction.

When a primary server stores light committed changes in a log, they may be stored in a binary format. The primary server may communicate changes to a secondary server in that same format.

Figure 11:
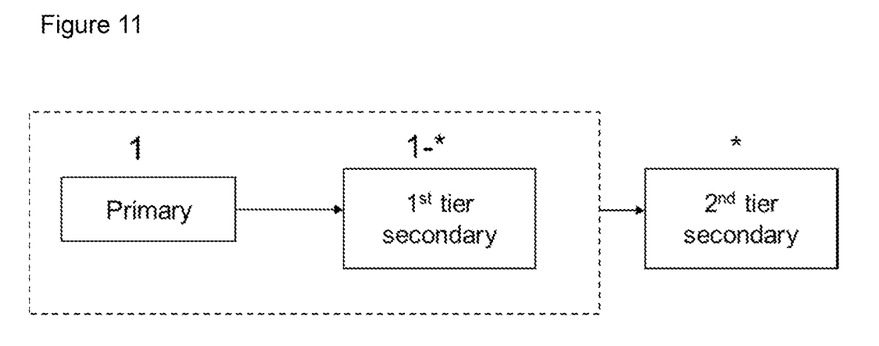
FIG. 11 shows functions in a multi-tier database architecture.

The approach of FIG. 6 may be embedded in a replication scheme with two tiers. (See the architecture of FIG. 11). The first tier replicates the changes synchronously, and the second tier asynchronously. Replication to the second tier is initiated when replication is finished in the first tier.

If there are multiple secondary servers, it may be possible to select how many acknowledgements for a change from different secondary servers must be received by the primary server before the primary server implements the final commit. The quantity may be a number, for example, 1, 2, 3 or more; a relative value, for example more than half; or a condition, for example, at least one acknowledge in each availability zone. It may equal the total number of secondary servers. This parameter may be set for each transaction.

Figure 12:
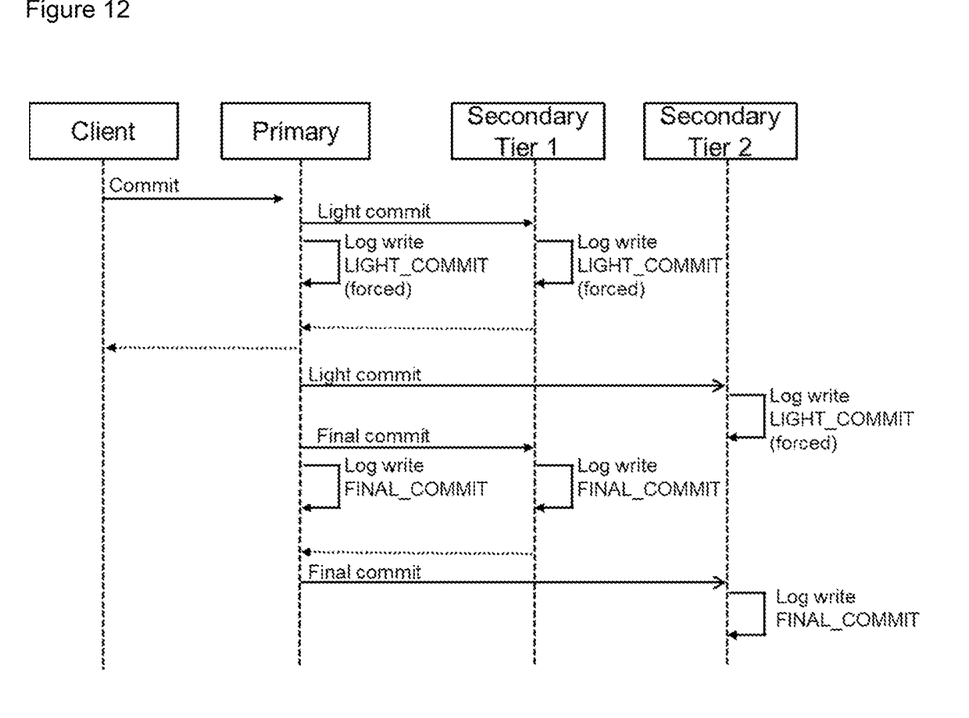
FIG. 12 illustrates a fourth message flow for making a change in a distributed database.

FIG. 12 shows an exemplary embodiment of a message flow in a multi-tier architecture. The primary server transmits the light commit message to at least one secondary server in tier 1 and transmits an acknowledgement to the client when at least one of those secondary servers has acknowledged the making of a light commit in tis copy of the database. Then the primary server causes the second tier to make the change. Here, the replication on the tier 1 is synchronous to the client's commit request and the replication on tier 2 is asynchronous.

The secondary server(s) might not do a forced write to the log. The latency of operations would then be shorter but in case of total system failure it might be necessary to recover the database from the last running primary copy.

The secondary server(s) might use a consensus protocol that is not full quorum. There are many examples of such, such as Paxos or Raft. Depending on the properties of the protocol, confidence in the integrity of the database may vary.

The inventors hereby indicate in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The inventors indicate that aspects of the present disclosure may consist of any such individual feature or combination of features. In view of the foregoing description, it will be evident to a person skilled in the art that various modifications may be made within the scope of the disclosure.

What is claimed is:

1. A first database server for implementing a distributed database, the first database server having a processor and one or more communication interfaces for communicating with a client and with a second database server, the first database server being configured to implement a change to the distributed database communicated from the client by:
   communicating the change to the second database server before storing in a first copy of the distributed database managed by the first database server a tentative record of the change;
   after communicating the change to the second database server, storing in the first copy of the distributed database the tentative record of the change; and
   upon receiving from the second database server an acknowledgement that the second database server has stored a tentative record of the change in a second copy of the distributed database managed by the second database server: (i) instructing the second database server to store a permanent record of the change in the second copy of the distributed database; and (ii) storing in the first copy of the distributed database, the permanent record of the change.

2. The first database server as claimed in claim 1, wherein the first database server is further configured to implement the change by:
   receiving an indication of the change from the client, the change involving a modification of one or more elements of the distributed database;
   subsequent to the receiving the indication of the change, but prior to the communicating the change to the second database server, locking in the first copy of the distributed database the elements involved in the change; and
   subsequent to the receiving from the second database server the acknowledgement that the second database server has stored the record of the change in the second copy of the distributed database, unlocking in the first copy of the distributed database the elements involved in the change.

3. The first database server as claimed in claim 1, wherein the first database server is configured to implement the change by:
   receiving an indication of the change from the client, the change involving a modification of one or more elements of the distributed database;
   creating a backup of the elements involved in the change as existing prior to the change; and
   subsequent to the receiving from the second database server the acknowledgement that the second database server has stored the record of the change in the second copy of the distributed database, removing the backup.

4. The first database server as claimed in claim 1, wherein the first database server is configured to communicate the change to the second database server by sending a message to the second database server, the only change to the second copy of the distributed database indicated by the message being the change communicated from the client.

5. The first database server as claimed in claim 1, wherein the first database server is configured to, having received acknowledgements from the second database server that the second database server has stored records of multiple changes, comprising the change, in the second copy of the distributed database, instruct the second database server to store a permanent record of the multiple changes by transmitting to the second database server a single message or a group of associated messages.

6. The first database server as claimed in claim 1, wherein the first database server is configured to, in response to receiving from the second database server the acknowledgement that the second database server has stored the tentative record of the change in the second copy of the distributed database, transmit to the client an acknowledgement of the change.

7. The first database server as claimed in claim 1, wherein the first database server is configured to, in a case where the first database server has been acting as a primary server and is subsequently demoted to acting as a secondary server, roll back, in the first copy of the distributed database, changes that are designated only by temporary records, but not roll back changes that are designated by permanent records.

8. The first database server as claimed in claim 1, wherein the first database server is configured to, in a case where the first database server has been acting as a primary server and fails without a secondary server being available, and is subsequently restored as the primary server, transform tentative records to permanent records.

9. The first database server as claimed in claim 1, wherein the first database server has a recovery mode of operation in which, in a case where an integrity of the first copy of the distributed database is prejudiced, the first database server is configured to automatically store, in the first copy of the distributed database or a replacement version of the distributed database, permanent records for all changes, comprising the permanent record for the change, for which only temporary records are stored in the first copy of the distributed database.

10. The first database server as claimed in claim 1, wherein the first database server is configured to store temporary records and permanent records, comprising the permanent record, in a log of the first copy of the distributed database.

11. The first database server as claimed in claim 1, wherein the first database server is a primary database server and the second database server is a secondary database server.

12. The first database server as claimed in claim 1, wherein the first database server is capable of operating as a secondary database server, and is configured to, in a case where the first database server is operating as the secondary database server, implement a second change to the distributed database communicated from a primary database server by:
   receiving the second change from the primary database server;
   storing in the first copy of the distributed database a tentative record of the second change; and
   transmitting to the primary database server a second acknowledgement for the second change.

13. The first database server as claimed in claim 12, wherein the first database server is configured to, in a case where the first database server is acting as the secondary database server:
   upon receiving from the primary database server an instruction to store a permanent record of one or more changes in the second copy of the distributed database, store in the first copy of the distributed database the respective permanent record of the one or more changes.

14. The first database server as claimed in claim 12, wherein the first database server is configured to, in a case where the first database server is acting as the secondary database server:
   subsequent to receiving the second change from the primary database server and prior to storing the tentative record of the second change, lock elements of the distributed database to which the second change relates; and
   subsequent to storing the tentative record of the second change, unlock the elements.

15. A method for implementing a change to a database by a first database server, the method comprising:
   receiving from a client an indication of a change to the database;
   communicating the change to a second database server before storing in a first copy of the distributed database managed by the first database server a tentative record of the change;
   after communicating the change to the second database server, storing, in the first copy of the database, the tentative record of the change;
   receiving, from the second database server, an acknowledgement that the second database server has stored a tentative record of the change in a second copy of the database managed by the second database server; and
   subsequent to the receiving of the acknowledgement: (i) instructing the second database server to store a permanent record of the change in the second copy of the database; and (ii) storing in the first copy of the database a permanent record of the change.

16. The method as claimed in claim 15, the method comprising: subsequent to the receiving of the acknowledgement and before the instructing of the second database server to store the permanent record of the change in the second copy of the database, transmitting to the client an acknowledgment for the change.

* * * * *